(12) United States Patent
Nagata et al.

(10) Patent No.: US 6,514,591 B1
(45) Date of Patent: Feb. 4, 2003

(54) OPTICAL INFORMATION RECORDING MEDIUM

(75) Inventors: Ken'ichi Nagata, Hyogo (JP); Noboru Yamada, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/569,136

(22) Filed: May 11, 2000

(30) Foreign Application Priority Data

May 12, 1999 (JP) .......................................... 11-130901

(51) Int. Cl.$^7$ .............................. B32B 3/02; G11B 7/24; G11B 3/74
(52) U.S. Cl. .................... 428/64.4; 428/64.6; 428/64.9; 369/275.1; 369/94
(58) Field of Search .............................. 428/64.4, 64.6, 428/64.9; 369/275.1, 94

(56) References Cited

U.S. PATENT DOCUMENTS 5,410,534 A * 4/1995 Nagata et al. ............ 369/275.4
5,726,969 A    3/1998 Moriya et al. ............ 369/275.1

FOREIGN PATENT DOCUMENTS

JP            9-212917       8/1997

* cited by examiner

Primary Examiner—Cynthia H. Kelly
Assistant Examiner—L. Ferguson
(74) Attorney, Agent, or Firm—Merchat & Gould P.C.

(57) ABSTRACT

An optical information recording medium comprises a substrate and a multilayered film formed on the substrate, the multilayered film comprising a first information layer, a separating layer, and a second information layer in this order from the side of the substrate. Each of the first information layer and the second information layer comprises a recording layer in which an optical change is caused by irradiation of laser light, and in the first and second information layers, signals can be recorded/reproduced on/from the recording layer by irradiating the recording layer with laser light through the substrate. The first information layer comprises a first protective layer, the recording layer, and a second protective layer in this order from the side of the substrate, and at least one of the first protective layer and the second protective layer comprises at least two layers. The at least two layers comprise a first layer and a second layer in this order from the side near the recording layer. The heat conductivity of a material constituting the second layer is larger than that of a material constituting the first layer.

18 Claims, 8 Drawing Sheets

OPTICAL INFORMATION RECORDING MEDIUM

BACKGROUND OF THE INVENTION

1. Field of the Invention

The present invention relates to an optical information recording medium for recording and reproducing information with a large capacity, using laser light.

2. Description of the Prior Art

Currently, DVDs can record signals at a higher density than any other read-only optical information recording media commercially available at present.

For a read-only DVD having a diameter of 120 mm, there are specified formats such as a single layer type of reading one face with a maximum user capacity of 4.7 GB, a single layer type of reading two faces with a maximum of 9.4 GB, and a double layer type of reading one face with a maximum of 8.5 GB. FIG. 7 shows an example of the structure of an optical disk of the double layer type of reading one face (hereinafter, referred to as "one-face-double layer structure). In this optical disk, signals recorded either in a first information layer 21 or a second information layer 23 can be reproduced by irradiating the information layers with laser light 25 through a substrate 20. An optically separating layer 22 for separating the first information layer 21 and the second information layer 23 optically with respect to the incident laser light 25 is provided between the first information layer 21 and the second information layer 23. A protective substrate 24 is provided on the second information layer 23 for protecting this information layer.

Examples of an optical information recording medium capable of recording and reproducing signals using laser light include a phase change type optical disk, a magneto-optical disk, an optical disk using a dye material or the like.

In a recordable phase change type optical disk, a chalcogenide typically is used as a recording layer material. Generally, the crystalline state of the recording layer material is used as a non-recorded state. Signals are recorded by irradiating the recording layer material with laser light so as to melt and quench the recording layer material so that the material becomes amorphous to form a recording mark. On the other hand, in order to erase signals, the recording layer is irradiated with laser light at a power lower than that for recording so that the recording layer becomes crystalline. The recording layer made of a chalcogenide is formed in the amorphous state. Therefore, it is necessary to crystallize entirely the recording regions beforehand to obtain a non-recorded state. In general, this crystallization for initialization is incorporated in the disk production process, and the recording layer is changed to be in the crystalline state using a laser light source or a flash light source.

For the purpose of increasing the speed at which signals are recorded on a recordable and erasable phase change type optical disk, light absorption correction that is suitable for high linear velocity has been proposed. In such a structure, for example, the light absorptance of the recording layer with respect to laser light for irradiation for recording is designed to be larger when the recording layer is crystalline than it is amorphous.

Furthermore, so-called land & groove recording in which signals are recorded both on guide grooves and on portions between the guide grooves (lands) formed on a surface of the substrate has been proposed for the purpose of improving the recording density of a recordable or recordable and erasable optical disk.

Furthermore, a one-face-double layer structure has been proposed for the purpose of increasing the recording capacity of a recordable or recordable and erasable phase change type optical disk (e.g., JP 9-212917).

In the recordable and erasable optical disk with a one-face-double layer structure, it is desired that the first information layer, which is near the side to which laser light for recording and reproduction is incident, has a high transmittance and high recording sensitivity, can be overwritten at a high speed, can be recorded both in lands and grooves, and has good repetition characteristics for recording and erasure.

SUMMARY OF THE INVENTION

Therefore, with the foregoing in mind, it is a principal object of the present invention to achieve high sensitivity of the first information layer positioned nearest the light incident side in an optical information recording medium on which signals are recorded/reproduced in an arbitrary layer by accessing at least two information layers from one side.

An optical information recording medium of a preferable embodiment of the present invention includes a substrate and a multilayered film formed on the substrate, the multilayered film comprising a first information layer, a separating layer, and a second information layer in this order from the side of the substrate. Each of the first information layer and the second information layer comprises a recording layer in which an optical change is caused by irradiation of laser light, and in the first and second information layers, signals can be recorded/reproduced on/from the recording layer by irradiating the recording layer with laser light through the substrate. The first information layer comprises a first protective layer, the recording layer, and a second protective layer in this order from the side of the substrate, and at least one of the first protective layer and the second protective layer comprises at least two layers. The at least two layers comprise a first layer and a second layer in this order from the side near the recording layer. The heat conductivity of a material constituting the second layer is larger than that of a material constituting the first layer.

These and other advantages of the present invention will become apparent to those skilled in the art upon reading and understanding the following detailed description with reference to the accompanying figures.

DESCRIPTION OF THE PREFERRED EMBODIMENTS

Hereinafter, preferable embodiments of the present invention will be described with reference to the accompanying drawings.

Figure 1:
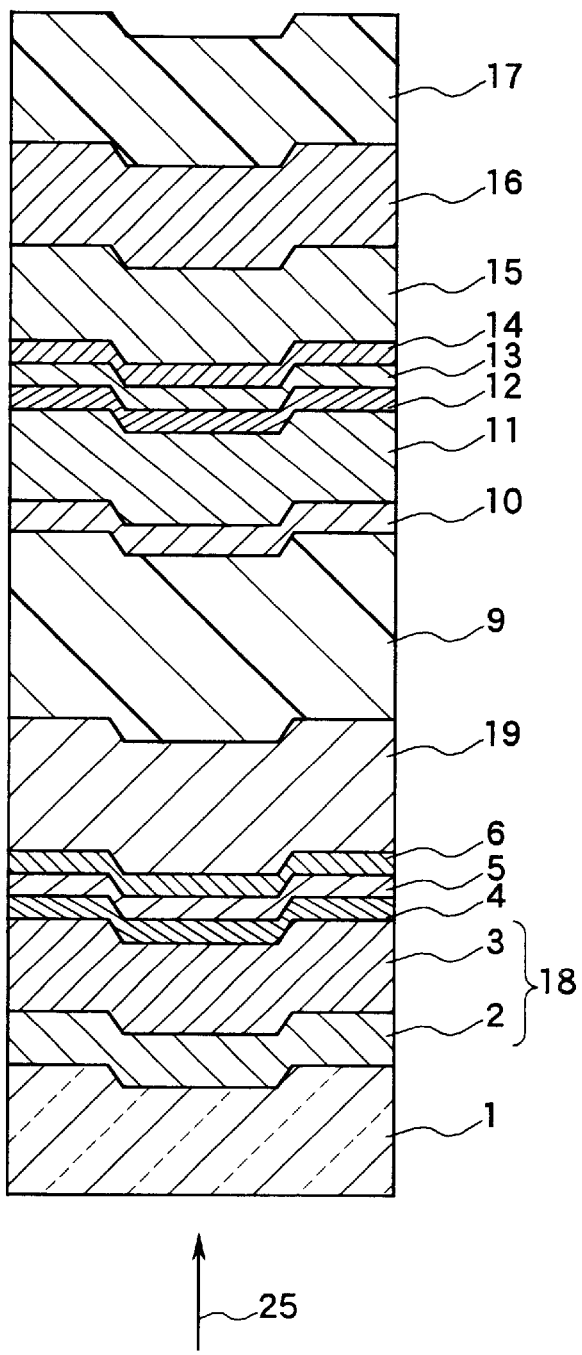
FIG. 1 is a cross-sectional view showing an embodiment of an optical information recording medium of the present invention.
Figure 2:
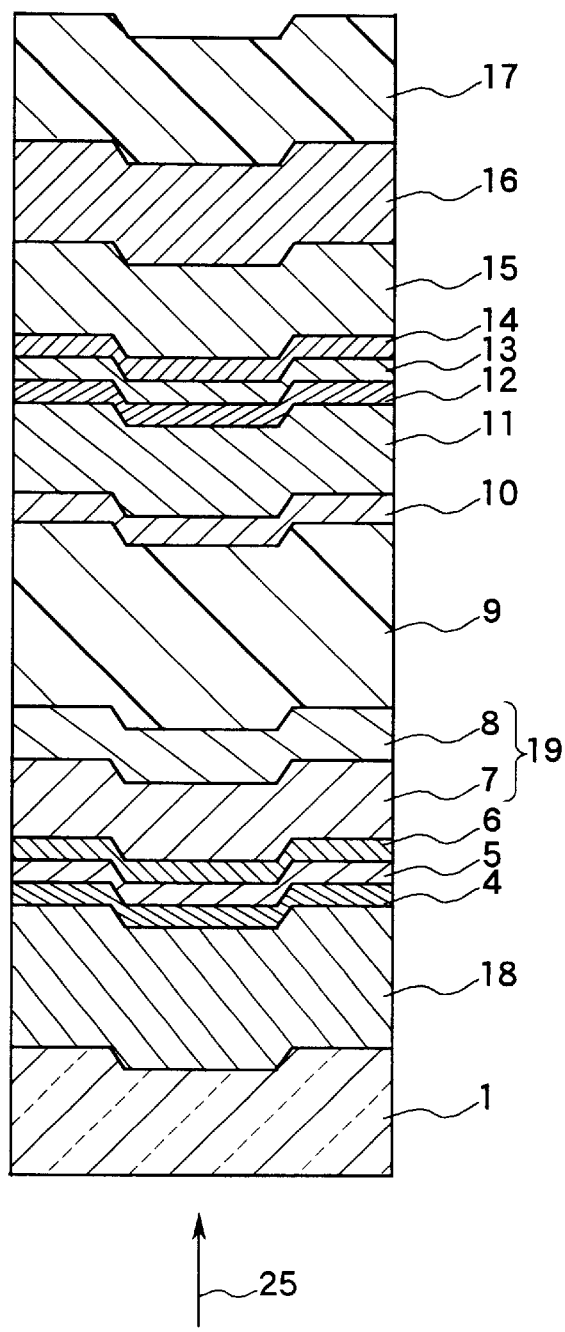
FIG. 2 is a cross-sectional view showing another embodiment of an optical information recording medium of the present invention.

FIGS. 1 and 2 are schematic cross-sectional views showing an example of the structure of an optical information recording medium with a one-face-double layer structure of the present invention. In these optical disks, a multilayered film that acts as a first information layer is provided on the side of a substrate 1, and a multilayered film that acts as a second information layer is provided on the side of a protective substrate 17. Each of the information layers includes a recording layer 5, 13 that changes reversibly between the amorphous state and the crystalline state by irradiation of laser light 25.

The first information layer is a laminate including a first protective layer 18, a first interface layer 4, a first recording layer 5, a second interface layer 6, and a second protective layer 19. In the optical disk shown in FIG. 1, the first protective layer 18 has a double layer structure where a first layer 3 and a second layer 2 are laminated in this order from the side of the recording layer 5. In the optical disk shown in FIG. 2, the second protective layer 19 has a double layer structure where a first layer 7 and a second layer 8 are laminated in this order from the side of the recording layer 5.

The second information layer is a laminate including a semi-transmission layer 10, a third protective layer 11, a third interface layer 12, a second recording layer 13, a fourth interface layer 14, a fourth protective layer 15, and a reflective layer 16.

Figure 3:
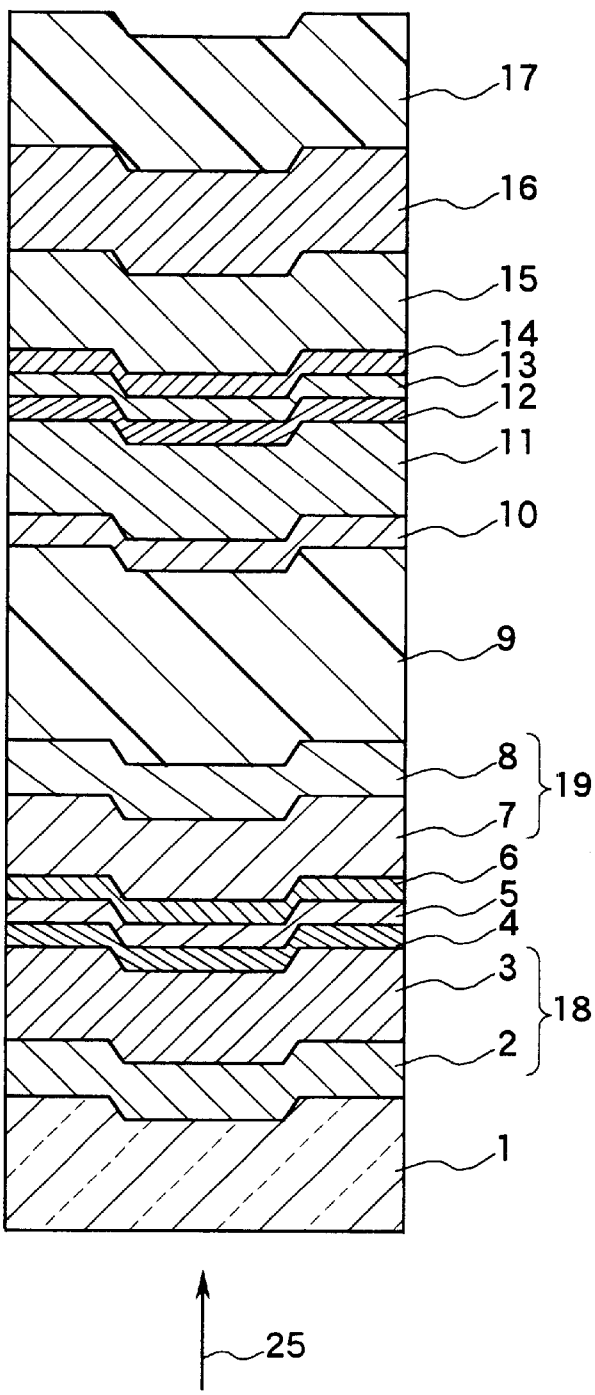
FIG. 3 is a cross-sectional view showing still another embodiment of an optical information recording medium of the present invention.
Figure 4:
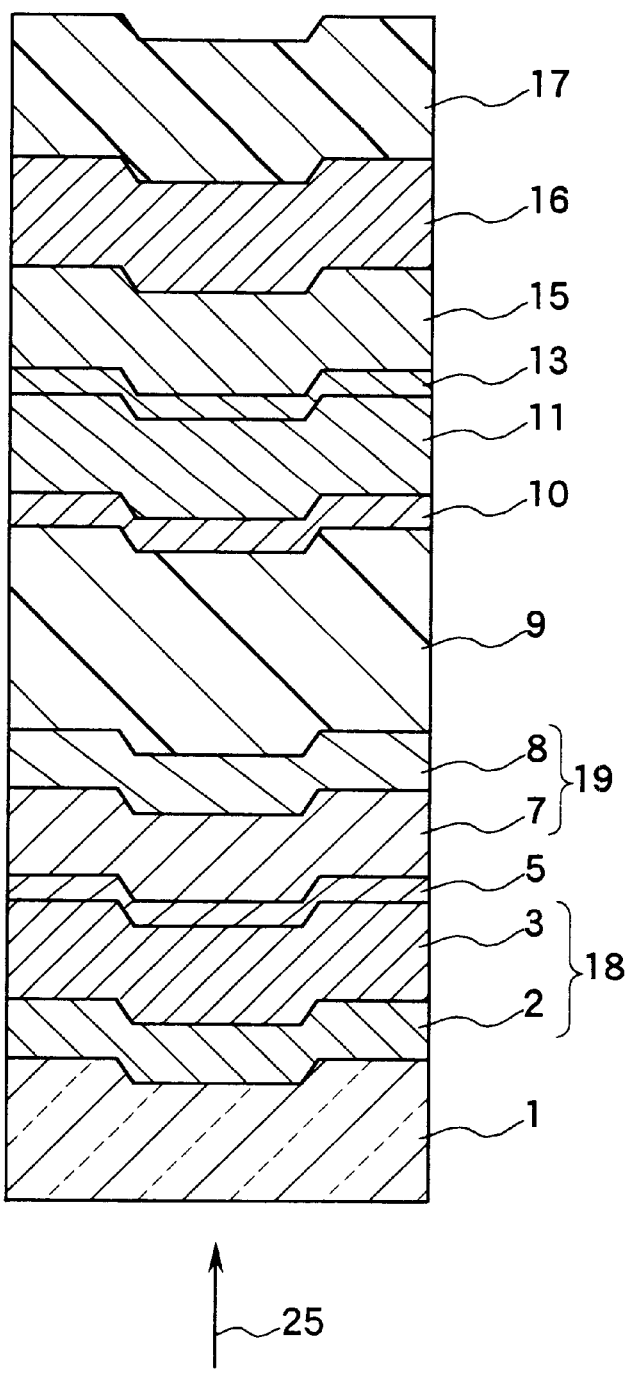
FIG. 4 is a cross-sectional view showing yet another embodiment of an optical information recording medium of the present invention.

In the optical disks shown in FIGS. 1 and 2, the interface layers 4, 6, 12, 14 are formed in contact with the recording layers 5, 13 on both sides thereof. The interface layer is not necessarily provided, as shown in FIG. 4. Furthermore, although in the optical disks shown in FIGS. 1 and 2, one of the protective layers 18 and 19 in contact with the recording layer 5 consists of two layers, both of the protective layers can have a double layer structure, as shown in FIG. 3. Alternatively, the protection layer can have three or more layers.

Hereinafter, the materials for the components will be described.

The substrate 1 can be formed of a resin such as polycarbonate or PMMA, or glass, and a spiral or concentric circular continuous groove (guide groove, track) is formed on a surface thereof. Furthermore, the substrate 1 may be formed by spin-coating. In this case, for example, the second information layer is formed on the protective substrate 17, and then the optically separating layer whose surface is covered with spiral or concentric continuous grooves is formed by a 2P (photo-polymerization) method. On top of that, the first information layer is formed. In the case where the substrate 1 is formed by spin-coating, the thickness of the substrate can be 100 μm or less.

The second layer 2, 8 provided at positions more distant from the recording layer of the layers constituting the protective layer serves to cool rapidly the recording layer 5 that has been heated by laser irradiation for recording, thereby forming an amorphous mark efficiently. For this reason, for the second layer 2, 8, a material having a larger heat conductivity than that for the first layer 3, 7 is used. Moreover, it is preferable to use a physically and chemically stable material that has a higher melting point and softening point than the melting point of a recording material used for the recording layer 5. Furthermore, it is desirable to use a material as transparent as possible with respect to the wavelength of the laser light used for recording/reproduction. Examples of materials that satisfy these requirements include dielectric materials such as aluminum nitride ($AlN_x$), silicon nitride ($SiN_x$), titanium nitride (TiN), silicon carbide (SiC), aluminum oxide ($Al_2O_3$) or the like. It is preferable that the second layer comprises at least one selected from these dielectric materials as the main component. In general, it is preferable that the second layer comprises at least one selected from the group consisting of a nitride and a carbide as the main component. Examples of these materials are $AlN_x$, $SiN_x$, TiN, and SiC as described above.

The first layer 3, 7 provided on the side nearer the recording layer has the function of preventing the recording layer from being heated unnecessarily during recording so as to improve the repetition characteristics for recording and erasure. Furthermore, the first layer is provided to facilitate adjusting the optical characteristics (reflectance, light absorptance, transmittance, the phase of the reflected light or the like at recording and non-recording) of the first information layer to desired values, namely, to enhance the freedom degree in the design. For the materials for the first layers 3 and 7, materials having a higher melting point and softening point than the melting point of a recording material used for the recording layer 5 is preferable for the same reason for the second layer. Furthermore, it is desirable to use a material that does not form a solid solution with the recording material. Furthermore, it is preferable to use a material as transparent as possible with respect to the wavelength of the laser light used for recording/reproduction. Examples of materials that satisfy these requirements include dielectric materials such as zinc sulfide (ZnS), tantalum oxide ($Ta_2O_5$), silicon oxide ($SiO_x$) or the like. It is preferable that the first layer comprises at least one selected from these dielectric materials as the main component. In particular, one of the most preferable dielectric materials is a mixture of ZnS and $SiO_x$. In the case where the second layer is formed of a material comprising at least one selected from a group consisting of a nitride and a carbide as the main component. It is preferable that the first layer comprises at least one selected from a group consisting of a oxide and a sulfide as the main component.

In this specification, the main component refers to a component that makes up at least 50% by weight.

When the first layer 3 (of the first protective layer), which is near the substrate, and the first layer 7 (of the second protective layer), which is distant from the substrate, are formed of different materials, the freedom degree in the thermal and optical disk design advantageously is increased. Alternatively, the protective layers can be formed of the same material.

The third protective layer 11 and the fourth protective layer 15 in the second information layer have the function of preventing the recording layer from being heated unnecessarily during recording so as to improve the repetition characteristics for recording and erasure. Furthermore, these protective layers are provided to facilitate adjusting the optical characteristics (reflectance, light absorptance, transmittance, the phase of the reflected light or the like at recording and non-recording) of the second information layer to desired values, namely, to enhance the freedom degree in the design. Also for the materials for these protective layers, it is preferable to use materials that satisfy the requirements described above. More specifically, for the protective layers, it is preferable to use materials comprising dielectric materials such as $Al_2O_3$, $SiO_x$, $Ta_2O_5$, $MoO_3$, $WO_3$, $ZrO_2$, ZnS, $AlN_x$, BN, $SiN_x$, TiN, ZrN, $PbF_2$, $MgF_2$, SiC or the like as the main component. When the protective layers 11 and 15 are formed of different materials, the freedom degree in the thermal and optical disk design advantageously is increased. Alternatively, the protective layers can be formed of the same material.

It is preferable that the interface layers 4, 6, 12 and 14 are formed of a material comprising a nitride or an oxynitride as the main component. These materials can be expressed by a general formula: X—N and X—O—N, where X preferably is at least one element selected from the group consisting of Ge, Cr, Si, Al, and Te. Most preferably, X is Ge. The interface layers are provided in contact with the recording layers 5 and 13, and have the function of suppressing mutual diffusion of the elements constituting the layers 3, 7, 11, and 15 in contact with the recording layer so as to improve the repetition characteristics for recording and erasure.

The recording layers 5 and 13 are formed of a material that can be changed to be in a state with different optical characteristics by irradiation of laser light. For example, a phase changeable material comprising Te, In, or Se as the main component can be used. Examples of the main component of the phase changeable material include Te—Sb—Ge, Te—Ge, Te—Ge—Sn, Te—Ge—Sn—Au, Sb—Se, Sb—Te, Sb—Se—Te, In—Te, In—Se, In—Se—Tl, In—Sb, In—Sb—Se, In—Se—Te or the like.

A material composed of the three elements Ge, Sb and Te can provide good repetition characteristics for recording and erasure. When the ratio by atomic weight of the elements is represented by $Ge_xSb_yTe_z$, the compositions in the range that satisfies $0.10 \leq x \leq 0.45$, $0.10 \leq y$, $0.45 \leq z \leq 0.65$, and $x+y+z=1$ are particularly excellent materials to achieve the object of the present invention.

In general, the recording layers 5 and 13 are formed in the amorphous state, and absorb energy of laser light or the like for crystallization, so that the optical constants (refractive index n and extinction coefficient k) are changed.

The separating layer (optically separating layer) 9 in the optical information recording medium with the one-face-double layer structure preferably is formed of a transparent material with respect to the wavelength of the laser light for irradiation for recording/reproducing information in the second information layer. The separating layer has the function of separating optically the first information layer and the second information layer. The separating layer can be formed of a material, for example, an epoxy-based ultraviolet curable resin, or a two-faced tape for attaching optical disks (for example, an adhesive sheet DA-8320 manufactured by Nitto Denko). The optically separating layer is formed by spin-coating or a 2P method. In the case where the optically separating layer is formed by the 2P method, there are two methods as follows. In a first method, the first information layer is formed on the substrate 1, and then the optically separating layer whose surface is covered with spiral or concentric continuous grooves is formed by the 2P method. On top of that, the second information layer is formed. In this case, the protective substrate 17 is not always necessary. In another method, the second information layer is formed on the protective substrate 17, and then the optically separating layer whose surface is covered with a spiral or concentric continuous groove is formed by a 2P method. On top of that, the first information layer is formed. In this case, the substrate 1 is formed by spin-coating, attachment of an adhesive sheet or the like.

The semi-transmission layer 10 preferably is formed of a material comprising metal elements such as Au, Ag, Al, Si or the like as the main element. This layer is provided to facilitate the correction of light absorption in the second information layer.

The reflective layer 16 preferably is formed of a material comprising metal elements such as Au, Ag, Al, Ni, Fe, Cr or the like as the main component. This layer has the function of increasing the efficiency of light absorption in the second information layer.

The protective layer 17 can be a resin layer formed by, for example, spin coating, or can be a resin sheet or a glass sheet similar to the substrate 1. When a guide groove for the second information layer is not formed on a surface of the optically separating layer 9, spiral or concentric circular continuous grooves (guide groove, track) may cover the surface of the protective substrate 17.

The first and second information layers are formed on a substrate of the substrate 1 and a substrate of the protective substrate 17, respectively. The substrate 1 and the protective substrate 17 are attached in such a manner that the two information layers are opposed to each other via the optically separating layer 9. When the guide grooves for the second information layer are formed on a surface of the optically separating layer 9 by 2P (photo-polymerization) method or the like, the surface of the protective substrate 17 can remain smooth.

The recording layer, the protective layer, the interface layer, the semi-transmission layer, and the reflective layer are formed generally by electron beam evaporation, sputtering, ion plating, a CVD (chemical vapor deposition) method, laser sputtering or the like.

Figure 8:
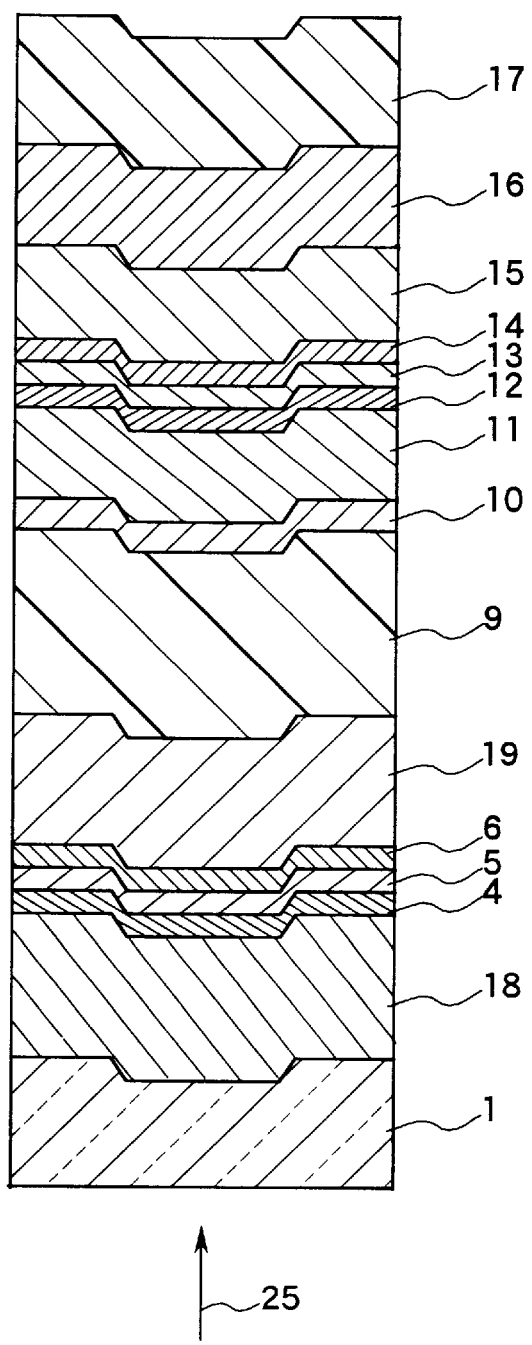
FIG. 8 is a cross-sectional view of a conventional optical information recording medium with a one-face-double layer structure.

FIG. 8 shows an example of an optical disk with a one-face-double layer structure having a conventional protective layer. The first information layer of this optical disk is not provided with the reflective layer, so that release of heat generated in the recording layer 5 by irradiation of laser light for recording is significantly poor. This is because the heat conductivity of the dielectric material used for the protective layer is significantly smaller than that of the metal material that would be used for the reflective layer. Unless the heat generated in the recording layer is released promptly, it becomes difficult to change the recording layer material from the crystalline state to the amorphous state. Thus, it is difficult to form a recording mark, thus deteriorating the recording sensitivity. This is a problem proper to the one-face-double layer structure.

However, it was found that when the protective layer is provided in such a manner as in the above embodiment, high sensitivity can be achieved without the reflective layer.

According to experiments, the thickness of the recording layer preferably is 15 nm or less for high sensitivity. However, when the recording layer is too thin, good recording and erasure characteristics cannot be obtained. A suitable lower limit for the thickness of the recording layer is about 4 nm. The structure of the protective layer of the present invention is suitable especially when the recording layer is thin and releases only a little heat in the inplane direction.

When the structure shown in FIG. 1 is compared with that shown in FIG. 2, the effect of high sensitivity is larger when the multilayered protective layer is provided on the laser light incident side, as shown in FIG. 1. This is believed to be because the amount of absorbed laser light is larger on the laser light incident side. If the multilayered protective layers are provided on both sides of the recording layer, as shown in FIG. 3, the effect of improving the sensitivity becomes even larger.

If the cooling ability of the recording layer is desired to be improved, all the protective layers may be formed of materials having high heat conductivity. However, in fact, when the first layers 3 and 7 are formed of a material having high conductivity, the sensitivity deteriorates. This is believed to be because the recording layer, when irradiated with laser light, is prevented from being heated by rapid release of heat from the protective layers, so that the temperature of the recording layer material does not reach the temperature necessary for recording.

On the other hand, after the recording layer material reaches a sufficiently high temperature by irradiation of laser light and becomes molten, the larger level of heat release from the recording layer is the more desirable. Therefore, as described above, the thinner recording layer is the better. Furthermore, in order to remove heat from the recording layer promptly after an appropriate period of time has passed from the start of irradiation of laser light, it is preferable to increase the heat conductivity of the protective layer that is not formed directly on the recording layer.

In order to optimize the retention of the heat in the recording layer and the release of the heat from the recording layer, it is preferable to adjust the thickness of each of the layers constituting the protective layer. As evident from the examples described later, specific preferable thicknesses are as follows. When the multilayered protective layer is provided only on the laser light incident side, as shown in FIG. 1, it is preferable that each of the first layer 3 and the second layer 2 of the first protective layer 18 is 30 nm or more. When the multilayered protective layer is provided only on the side opposite to the laser light incident side, as shown in FIG. 2, it is preferable that the first layer 7 of the second protective layer 19 is 30 nm or more and the second layer 8 is 20 nm or more. When the multilayered protective layers are provided on both sides of the recording layer 5, as shown in FIGS. 3 and 4, the same ranges as above are preferable.

In any of the above cases, it is preferable that the first layer 3 and 7 of the first and second protective layers 18 and 19 are 100 nm or less. When the first layers 3 and 7 are too thick, the effect of heat release via the second layers 4 and 8 may not be sufficient.

The thickness of the interface layer preferably is 40 nm or less, especially when the interface layer is formed of a nitride having a particularly high heat conductivity. When the recording layer is in contact with a thick layer having a high heat conductivity, the recording sensitivity deteriorates.

The optical disks of the above-described embodiments can improve the recording sensitivity of the first information layer, although the first information layer includes the first protective layer, the recording layer, and the second protective layer, and both the protective layers are substantially made of dielectric materials having a low heat conductivity (in order words, the first information layer does not include a metal film that acts as the reflective film).

EXAMPLES

Hereinafter, the present invention will be described more specifically by way of example, but is not limited thereto.

Example 1

Polycarbonate having a radius of 120 mm and a thickness of 0.58 mm was used as a substrate (first substrate). The substrate was covered with guide grooves of concavities and convexities having a pitch of 0.60 µm and a groove depth of 70 nm. As the first protective layer, AlN (second layer) and ZnS-35 mol %$SiO_2$ (first layer) were formed thereon in this order. Then, $Ge_{29}Sb_{21}Te_{50}$ (recording layer) was formed. Further, as the second protective layer, ZnS-20 mol %$SiO_2$ (first layer) and AlN (second layer) were formed in this order. Thus, the first information layer was formed on the substrate. The thickness of the recording layer was 7 nm, and the thickness of each of the layers constituting the protective layer is set within the range from 0 to 110 nm. All the layers were formed by magnetron sputtering.

Furthermore, a reference disk in which neither the first protective layer or the second protective layer includes the second layer of AlN was produced. In the reference disk, the thicknesses of the ZnS-35 mol %$SiO_2$ (the first protective layer), $Ge_{29}Sb_{21}Te_{50}$ (recording layer), and ZnS-20 mol %$SiO_2$ (the second protective layer) were 100 nm, 7 nm, and 110 nm, respectively.

Similarly, polycarbonate having a radius of 120 mm and a thickness of 0.6 mm was used as a second substrate (protective substrate). The substrate was covered with guide grooves of concavities and convexities having a pitch of 0.60 µm and a groove depth of 70 nm. Then, Al-20 at %Cr, ZnS-20 mol %$SiO_2$, $Ge_{29}Sb_{21}Te_{50}$, ZnS-20 mol %$SiO_2$, and Au were formed by magnetron sputtering so that the thicknesses thereof became 16 nm, 80 nm, 10 nm, 70 nm, and 10 nm, respectively. Thus, the second information layer was formed on the protective substrate.

The widths of the grooves on the first substrate and the second substrate were selected so that the amplitude of the reproduced signal when reproducing a signal recorded on the grooves is substantially equal to that when reproducing a signal recorded between the grooves.

Further, an epoxy based ultraviolet curable resin was applied 40 µm thick onto the first information layer, and the protective substrate was superimposed thereon so that the first information layer and the second information layer were opposed. Then, irradiation of ultraviolet rays was performed. Thus, an optical disk was obtained where the substrate, the first information layer, the optically separating layer, the second information layer, and the protective layer were laminated in this order.

In this optical disk, the crystalline state of the recording layer is used as the non-recorded state, and the amorphous state of the recording layer is used as the recorded state. Table 1 shows the designed values of the optical characteristics of the reference disk at a wavelength of 650 nm, and Table 2 shows the values obtained by actual measurement (the optical characteristics were measured using a mirror finished substrate without guide grooves in order to eliminate the influence of diffraction at the grooves).

TABLE 1

|  | The first information layer (before attachment) | The second information layer (before attachment) |
| --- | --- | --- |
| Reflectance (amorphous) | 2% | 37% |
| Reflectance (crystalline) | 11% | 13% |
| Transmittance (amorphous) | 70% | — |
| Transmittance (crystalline) | 45% | — |
| Recording thin film absorptance (amorphous) | 28% | 35% |

TABLE 1-continued

|  | The first information layer (before attachment) | The second information layer (before attachment) |
|---|---|---|
| Recording thin film absorptance (crystalline) | 46% | 65% |
| Phase difference of reflected light (crystalline/amorphous) | 15 degrees | 11 degrees |

TABLE 2

|  | The first information layer (before attachment) | The second information layer (before attachment) |
|---|---|---|
| Reflectance (as depo.) | 3% | 38% |
| Reflectance (crystalline) | 10% | 15% |
| Transmittance (as. depo) | 70% | — |
| Transmittance (crystalline) | 45% | — |

From the values of the reflectance and the transmittance in Tables 1 and 2, it is estimated that the optical characteristics of the produced optical disk are substantially as designed. It should be noted that when the second information layer is reproduced after attachment, the value obtained by multiplying the reflectance of the second information layer by the square of the transmittance of the first information layer is the effective reflectance of the second information layer due to the presence of the first information layer, which is provided nearer the light source. For example, when the first information layer is not recorded, the reflectance of the second information layer in the non-recorded state is 38%×45%×45%=8%.

Figure 5:
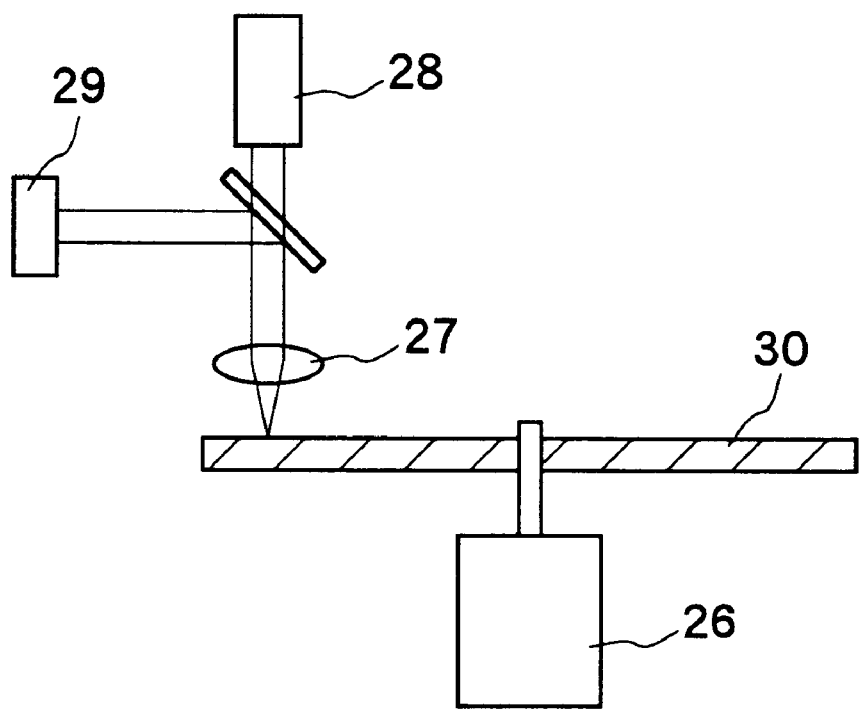
FIG. 5 is a schematic view showing a device for recording/reproducing information signals on the optical information recording medium of the present invention.

With this optical disk, using a recording/reproducing device shown in FIG. 5, signals are recorded on guide grooves and between the guide grooves (lands) of the optical disk 30 that is rotated by a spindle motor 26 and reproduced. The laser light source used for recording and reproduction was a semiconductor laser 28 with a wavelength of 650 nm, and the NA of the object lens 27 was 0.6. Recording information was recorded by modulating in a modulation system of 8/16, RLL (2,10). The recording linear velocity was 8 m/s, and the linear density of recording signals was 0.31 µm/bit. In the case where the recording pulse duty was 50%, the peak power was 13 mW or more so that signals were overwritten on both the first information layer and the second information layer. The laser light with which the optical disk 30 was irradiated for reproduction was received by a photodetector 29. The power of the light for reproducing signals was 2 mW.

Figure 6:
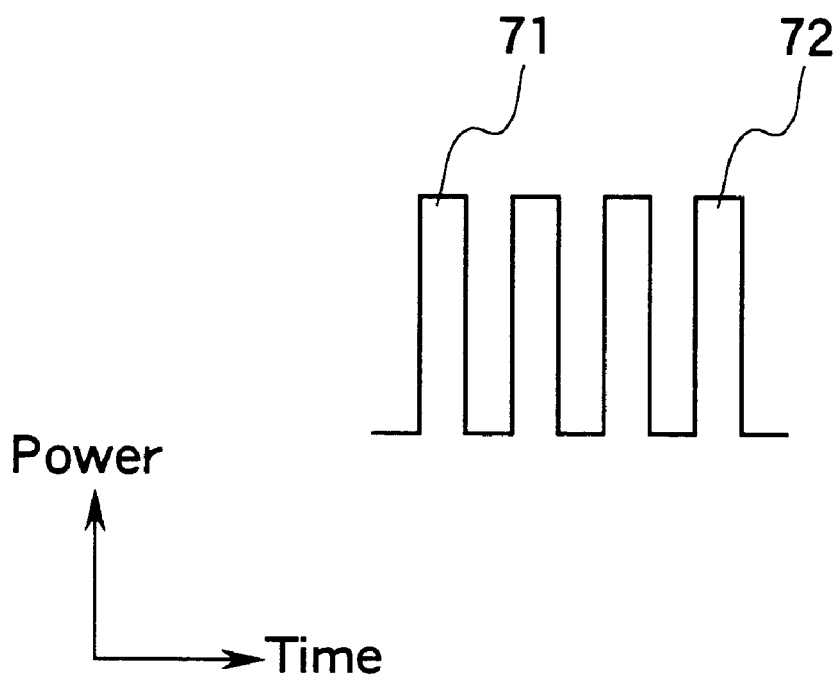
FIG. 6 shows a modulated wavelength of recording pulses when recording information on the optical disk.
Figure 7:
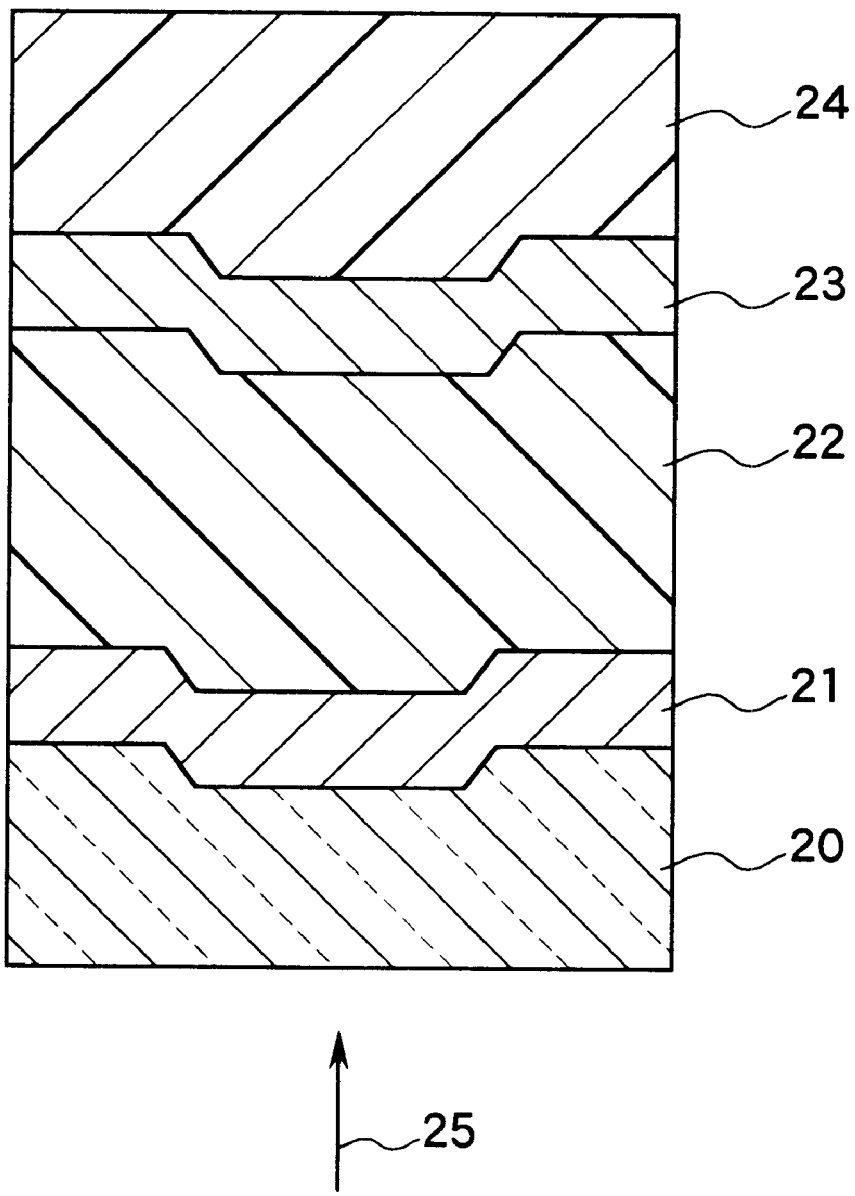
FIG. 7 is a cross-sectional view showing a read-only optical disk.

FIG. 6 shows a modulated wavelength of recording pulses. The shape of the leading pulse 71 during recording was determined such that the reproduction jitter was minimized in accordance with the length of a symmetric mark and the gap with a mark to be recorded before the symmetric mark. The shape of the last pulse 72 during recording was determined such that the reproduction jitter was minimized in accordance with the length of a symmetric mark and the gap with a mark to be recorded next to the symmetric mark.

After random signals were recorded on the entire surface of the first information layer, signals were recorded on the second information layer, and then the recording characteristics were investigated by repeating overwriting at a peak power (Pp) of 12 mW and a bias power of 5.5 mW. As a result, the reproduction jitter was 10% after 10 times overwriting, 11% after 10,000 times overwriting and 15% after 100,000 times overwriting.

Next, sample disks with varied thicknesses for each of the layers constituting the protective layer of the first information layer were produced without changing the structure of the second information layer, and the disks, including reference disks, were compared to see the difference in the characteristics.

Table 3 shows a part of the results of the recording, erasure and reproduction experiments of the first information layer.

TABLE 3

| The first protection layer | | The second protection layer | | Minimum jitter value (%) | | Recording power (mW) |
|---|---|---|---|---|---|---|
| the first layer | the second layer | the second layer | The first layer | groove | Land | |
| 0 | 100 | 110 | 0 | 9.0 | 9.3 | 13.5 |
| 20 | 90 | 110 | 0 | 8.9 | 9.3 | 13.3 |
| 30 | 70 | 110 | 0 | 8.8 | 9.2 | 12.9 |
| 50 | 50 | 110 | 0 | 8.7 | 9.3 | 12.2 |
| 70 | 30 | 110 | 0 | 8.9 | 9.4 | 12.9 |
| 80 | 20 | 110 | 0 | 8.8 | 9.3 | 14.0 |
| 0 | 100 | 100 | 10 | 8.8 | 9.2 | 13.4 |
| 0 | 100 | 90 | 20 | 8.7 | 9.4 | 12.7 |
| 0 | 100 | 70 | 40 | 8.8 | 9.2 | 11.8 |
| 0 | 100 | 50 | 60 | 8.9 | 9.3 | 12.2 |
| 0 | 100 | 30 | 80 | 8.8 | 9.3 | 12.8 |
| 0 | 100 | 20 | 110 | 8.7 | 9.4 | 13.9 |
| 30 | 70 | 70 | 40 | 8.9 | 9.3 | 12.0 |
| 50 | 60 | 70 | 40 | 8.8 | 9.2 | 11.2 |
| 70 | 30 | 70 | 40 | 8.9 | 9.3 | 12.1 |
| 50 | 60 | 90 | 20 | 8.7 | 9.3 | 12.4 |
| 50 | 60 | 30 | 80 | 8.7 | 9.3 | 12.3 |

*The minimum jitter values are those obtained after 10 times overwriting.
*The recording power is a power of laser light at which the minimum jitter value is obtained.

In Table 3, since each of the layers constituting the protective layer exhibits substantially the same optical constants with respect to the wavelength of 650 nm, these sample disks have optically the same structure, though they have thermally different structures.

As shown in Table 3, in order to achieve high sensitivity of the first information layer, in the case where the first protective layer consists of two layers and the second protective layer consists of a single layer, it is preferable that the thickness of the second layer, which is more distant from the recording layer, of the first protective layer is 30 nm or more, and that the thickness of the first layer, which is nearer the recording layer, of the first protective layer is 30 nm or more. For the same purpose, in the case where the second protective layer consists of two layers and the first protective layer consists of a single layer, it is preferable that the thickness of the second layer, which is more distant from the recording layer, of the second protective layer is 20 nm or more, and that the thickness of the first layer, which is nearer from the recording layer, of the second protective layer is 30 nm or more.

When both the first protective layer and the second protective layer consist of two layers, the effect of achieving high sensitivity is significant. In this case, it is preferable that the thickness of the second layer of the second protective layer is 20 nm or more, and the thicknesses of the other layers are 30 nm or more.

In the above ranges, the total thickness of the first protective layer and the second protective layers was adjusted to be in the range from 100 to 130 nm. This range is one example showing a preferable range for the total thickness, and the range of each protective layer is not limited by this range.

Furthermore, using $Ta_2O_3$ as the material of the first layer and SiN and SiC as the material of the second layer, recording sensitivity was investigated in the same manner as above. Then, substantially the same results were obtained.

Example 2

The same disks as those of Example 1 with the recording layer and each of the layers constituting the protective layer of the first information layer having predetermined thicknesses were produced. The recording characteristics of these optical disks were investigated under the same conditions as in Example 1. There is a tendency that the thicker the recording layer is, the lower transmittance the first information layer has. To adjust the transmittance of the first information layer to approximately 30%, it is preferable that the thickness of the recording layer of the first information layer is 15 nm or less. The repetition characteristics for recording and erasure of the first information layer depend significantly on the thickness of the recording layer of the first information layer. Table 4 shows the results when the first layers of both the protective layers are 40 nm thick.

TABLE 4

| Recording layer thickness (nm) | 3 | 4 | 5 | 6 | 7 | 8 | 10 | 12 |
|---|---|---|---|---|---|---|---|---|
| The number of time of recording | 1 | 100 | 2000 | 10,000 | 20,000 | 20,000 | 10,000 | 10,000 |

* The number of times of recording is the number of times until the jitter is increased 3% by repeated recording.

As shown in Table 4, the most preferable thickness of the recording layer of the first information layer is 4 nm or more.

Example 3

In the disks as in Example 1, the interface layers formed of a nitride were provided in contact with the recording layer on one or both sides thereof, for the purpose of improving the repetition recording characteristics of the first information layer. In the experiments, AlN (first layer of the first information layer), ZnS-35 mol %$SiO_2$ (second layer of the first protective layer), a first interface layer on the laser light incident side, $Ge_{29}Sb_{21}Te_{50}$ (recording layer), a second interface layer on the side opposite to the laser light incident side, ZnS-20 mol %$SiO_2$ (second layer of the second protective layer) and AlN (first layer of the second protective layer) were formed in this order on a polycarbonate substrate by magnetron sputtering. Thus, the first information layer was formed on the substrate. The thicknesses of the layers other than the interface layers were 50 nm, 60 nm, 7 nm, 70 nm, and 40 nm, respectively, in the order of the above description. All the formed interface layers were made of a nitride of Ge—N, Si—N or Cr—N. All the nitride interface layers were produced by magnetron sputtering in an atmosphere of Ar and $N_2$. Table 5 shows the results of investigating the recording and erasure characteristics under the recording conditions as shown in Example 1, using the produced disks.

TABLE 5

(thickness: nm)

| Interface layer | | | Repetition |
|---|---|---|---|
| Material | Incident side | Side opposite to incident side | recording times (× 10⁴) |
| — | — | — | 2 |
| GeN | 40 | 0 | 3 |
| GeN | 20 | 0 | 4 |
| GeN | 10 | 0 | 4 |
| GeN | 5 | 0 | 5 |
| GeN | 3 | 0 | 4 |
| GeN | 0 | 40 | 3 |
| GeN | 0 | 20 | 3 |
| GeN | 0 | 10 | 4 |
| GeN | 0 | 5 | 4 |
| GeN | 0 | 3 | 4 |
| GeN | 20 | 20 | 8 |
| GeN | 10 | 10 | >10 |
| GeN | 5 | 5 | >10 |
| GeN | 3 | 3 | >10 |
| SiN | 40 | 40 | 8 |
| SiN | 20 | 20 | >10 |
| SiN | 10 | 10 | >10 |
| SiN | 5 | 5 | >10 |
| SiN | 3 | 3 | >10 |
| CrN | 20 | 20 | >10 |
| CrN | 10 | 10 | >10 |
| CrN | 5 | 5 | >10 |
| CrN | 3 | 3 | >10 |

*Repetition recording time is the number of times of repeated recording at which the reproduction jitter at 10 times repetition recording is deteriorated 3%.

As seen in Table 5, in order to improve the cycle characteristics, it is preferable to provide the interface layer made of a nitride comprising Ge—N, Si—N, Cr—N or the like as the main component in contact with the recording layer. The interface layer exhibits the effect of improving the cycle characteristic whether it is provided on the side of laser incident side or on the side opposite thereto. However, it is most preferable to provide the interface layers in contact with the recording layer on both sides thereof. It is sufficient that the thickness of the interface layer is 3 nm in order to provide the effect. The thickness of the interface layer of 40 nm can provide the effect of improving the cycle. However, when the interface layer is thick, the recording sensitivity is reduced, so that a thickness of 10 nm or less is more preferable. From the viewpoint of the recording sensitivity, the most preferable material of the interface layer was Ge—N. This is believed to be because the heat conductivity of Ge—N is relatively smaller than that of other nitride layer materials.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical information recording medium comprising a substrate and a multilayered film formed on the substrate, the multilayered film comprising a first information layer laminate, a separating layer, and a second information layer laminate in this order from a side of the substrate, wherein each of the first information layer laminate and the second information layer laminate comprises a recording layer in which an optical change is caused by irradiation of laser light, and in the first and second information layer laminates, signals can be recorded/reproduced on/from the recording layer by irradiating the recording layer with laser light through the substrate, the first information layer laminate comprises a first protective layer) the recording layer, and a second protective layer in this order from the side of the substrate, and at least one of the first protective layer and the second protective layer comprises at least two sub layers, the first information layer laminate further comprising an interface layer in contact with the recording layer, a thickness of the interface layer being not more than 40 nm, the at least two sub layers comprise a first sub layer and a second sub layer in this order from a side near the recording layer, and a heat conductivity of a material constituting the second sub layer is greater than that of a material constituting the first sub layer.

2. The optical information recording medium according to claim 1, wherein the recording layer is formed of a material in which an optical change is caused reversibly between an amorphous state and a crystalline state by irradiation of laser light.

3. The optical information recording medium according to claim 1, wherein a thickness of the recording layer included in the first information layer laminate is not less than 4 nm and not more than 15 nm.

4. The optical information recording medium according to claim 1, wherein the first sub layer comprises at least one selected from the group consisting of an oxide and a sulfide as a main component.

5. The optical information recording medium according to claim 4, wherein the first sub layer comprises at least one selected from the group consisting of zinc sulfide, silicon oxide and tantalum oxide.

6. The optical information recording medium according to claim 5, wherein the first sub layer is formed of zinc sulfide and silicon oxide.

7. The optical information recording medium according to claim 1, wherein the second sub layer comprises at least one selected from the group consisting of a nitride and a carbide as a main component.

8. The optical information recording medium according to claim 7, wherein the second sub layer comprises at least one selected from the group consisting of aluminum nitride, silicon nitride, titanium nitride, and silicon carbide.

9. The optical information recording medium according to claim 1, wherein the second sub layer comprises at least one selected from the group consisting of aluminum nitride, silicon nitride, titanium nitride, silicon carbide, and aluminum oxide as a main component.

10. The optical information recording medium according to claim 1, wherein a thickness of the first sub layer is not less than 30 nm, and a thickness of the second sub layer is not less than 20 nm.

11. The optical information recording medium according to claim 1, wherein the first and second sub layers are between the substrate and the recording layer, and a thickness of each of the first sub layer and the second sub layer is not less than 30 nm.

12. The optical information recording medium according to claim 1, wherein a thickness of the first sub layer is not more than 100 nm.

13. The optical information recording medium according to claim 1, wherein at least one of the first protective layer and the second protective layer comprises two sub layers that are in contact with each other.

14. The optical information recording medium according to claim 1, wherein the first information layer laminate is not provided with a metal film that acts as a reflective layer.

15. The optical information recording medium according to claim 1, wherein the first information layer laminate comprises a first protective layer, a recording layer, and a second protective layer, and the first protective layer and the second protective layer are formed substantially of a dielectric material.

16. The optical information recording medium according to claim 1, wherein each of the first protective layer and the second protective layer comprises at least two sub layers, the at least two sub layers of each of the first protective layer and the second protective layer comprise a first sub layer that is near the recording layer and a second sub layer that is distant from the recording layer, and a heat conductivity of a material constituting the second sub layer is larger than that of a material constituting the first sub layer.

17. The optical information recording medium according to claim 15, wherein the first sub layer included in the first protective layer and the first sub layer included in the second protective layer are formed of different materials.

18. The optical information recording medium according to claim 1, in the interface layer comprises germanium nitride as a main component.

* * * * *

UNITED STATES PATENT AND TRADEMARK OFFICE
CERTIFICATE OF CORRECTION

PATENT NO.    : 6,514,591 B1
DATED         : February 4, 2003
INVENTOR(S)   : Nagata et al.

It is certified that error appears in the above-identified patent and that said Letters Patent is hereby corrected as shown below:

Column 13,
Line 16, "protective layer)" should read -- protective layer, --

Column 14,
Line 51, "in the" should read -- wherein the --

Signed and Sealed this

Twenty-third Day of December, 2003

JAMES E. ROGAN
*Director of the United States Patent and Trademark Office*